United States Patent
Müller et al.

(10) Patent No.: US 8,656,467 B1
(45) Date of Patent: Feb. 18, 2014

(54) SECURITY ARCHITECTURE (75) Inventors: Thomas Müller, Bochum (DE); Martin Roter, Bochum (DE)

(73) Assignee: Nokia Corporation, Espoo (FI)

( * ) Notice: Subject to any disclaimer, the term of this patent is extended or adjusted under 35 U.S.C. 154(b) by 1212 days.

(21) Appl. No.: 09/588,003

(22) Filed: Jun. 6, 2000

(30) Foreign Application Priority Data

Jun. 7, 1999 (GB) .................................. 9913195.5

(51) Int. Cl.
*H04L 29/06* (2006.01)

(52) U.S. Cl.
USPC .................................. 726/7; 726/29; 713/151

(58) Field of Classification Search
USPC ............ 713/161, 152, 151; 380/270; 455/411
See application file for complete search history.

(56) References Cited

U.S. PATENT DOCUMENTS

| | | | |
|---|---|---|---|
| 5,163,147 A | 11/1992 | Orita | |
| 5,577,209 A * | 11/1996 | Boyle et al. ........................ | 726/4 |
| 5,818,936 A | 10/1998 | Mashayekhi | |
| 5,953,528 A * | 9/1999 | Sullivan ........................ | 707/100 |
| 6,657,956 B1 | 12/2003 | Sigaud | |
| 6,731,625 B1 | 5/2004 | Eastep et al. | |
| 6,754,713 B1 * | 6/2004 | Dascalu ........................ | 709/229 |
| 6,957,342 B2 | 10/2005 | Vatanen | |
| 7,345,681 B2 | 3/2008 | Mehrotra et al. | |
| 7,428,404 B2 | 9/2008 | Kawaguchi | |
| 7,650,409 B2 | 1/2010 | Cain et al. | |
| 7,773,972 B2 | 8/2010 | Croome et al. | |
| 7,809,003 B2 | 10/2010 | Makela | |
| 7,944,355 B2 | 5/2011 | Kumar et al. | |
| 2005/0144437 A1 * | 6/2005 | Ransom et al. ............... | 713/151 |

FOREIGN PATENT DOCUMENTS

| | | |
|---|---|---|
| JP | 10 124459 A | 5/1998 |
| JP | 10506744 | 6/1998 |
| JP | 11031129 | 2/1999 |
| WO | 9918738 A2 | 4/1999 |
| WO | 9945454 | 9/1999 |
| WO | WO00/56105 | 9/2000 |

OTHER PUBLICATIONS

Leveridge et al, Data Communications, Jan. 7, 1999, PCT WO 99/00958.*

PCT International Search Report, Application No. PCT/FI00/00223; date of search Aug. 7, 2000.

Ericsson Review—vol. No. 3, 1998, JAAP Haartsen Bluetooth—The Universal Radio Interface for ADHOC, Wireless Connectivity, pp. 110-117, XP000783249 ISSN: 0014-0171 and Abstract.

Haartsen,J. et al: Bluetooth: Vision, Goals, and Architecture, Mobile Computing and Communications Review, U.S. ACM, New York, NY, vol. 2, No. 4, Oct. 1, 1998, pp. 38-45, XP000784002 and abstract.

(Continued)

*Primary Examiner* — Michael R Vaughan
(74) *Attorney, Agent, or Firm* — Banner & Witcoff, Ltd.

(57) ABSTRACT

A device for communicating with other devices to allow them to access applications, comprises: at least a first application; authentication means for authenticating a communicating device; and access control means accessible by a communicating device requesting access to the first application without the communicating device having been authenticated by the authentication means. The device is further arranged to arbitrate whether access of the communicating device to the first application is granted or refused wherein if the arbitration requires an authentication of the communicating device, the access control means instructs the authentication means to authenticate the communicating device.

27 Claims, 7 Drawing Sheets

(56) References Cited

OTHER PUBLICATIONS

Final office action in U.S. Appl. No. 11/275,964 dated Aug. 16, 2011.
Notification of Ground of Rejection in JP2001-502275 dated Feb. 7, 2012, with partial English translation.
Official Action in JP2010-248304 mailed Sep. 19, 2012.
Office Action in related Japanese Application No. 2001-502275, dated Jul. 8, 2010, pp. 1-2, English translation pp. 1-3.
Office Action in related U.S. Appl. No. 11/275,964, dated Sep. 30, 2010.
Office Action in JP2010-248304 dated Nov. 7, 2013, with English translation.
Non-patent reference listed in Office Action in JP2010-248304 dated Nov. 7, 2013, as Japanese non-patent literature (translation of the bibliography: author 'Ayamura', title "Internet Security Which Should be Started Now", Magazine Name "Software Design", No. 98, pp. 119-1289, Gijutsu-Hyohron Co., Ltd., Dec. 18, 1998.
English translation of pending claims of JP patent application No. 2010-248304 as of Nov. 7, 2013.

* cited by examiner

SERVICE DATABASE 122

| MULTIPLEXING ID | OPEN (YES / NO) | ENCRYPT (YES / NO) |
|---|---|---|
| $118_1$ | NO | YES |
| $118_2$ | YES | |
| $118_3$ | NO | NO |

FIG. 7a

DEVICE DATABASE 124

| BLUETOOTH ID | TRUSTED (YES / NO) | LINK KEY | PREVIOUS AUTHENTICATION IN SESSION (YES / NO) |
|---|---|---|---|
| A | YES | $L_A$ | |
| B | NO | $L_B$ | NO |
| C | YES | | |
| D | NO | $L_D$ | YES |

FIG. 7b

INFORMATION FLOW FOR ACCESS FOR TRUSTED DEVICES

FIG. 8a

INFORMATION FLOW FOR ACCESS FOR UNTRUSTED DEVICES

FIG. 10
AUTHENTICATION

FIG. 11
SECURITY MANAGER

SECURITY ARCHITECTURE

BACKGROUND OF THE INVENTION

The present invention relates to the provision of improved security in a device which has services accessible by other devices communicating with the device. It particularly relates to devices which are accessed over a radio interface in accordance with the BLUETOOTH specification (a digital wireless protocol).

Figure 1:
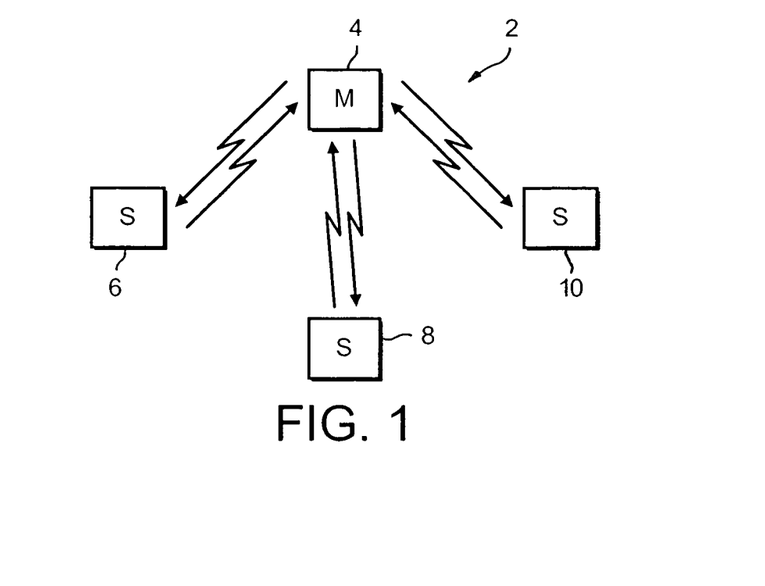
FIG. 1 illustrates a communications network including a master and slave units.

FIG. 1 illustrates a network 2 of radio transceiver units, including a master unit 4 and slave units 6, 8 and 10, communicating by transmitting and receiving radio packets. There is only one master in a network. The network operates in a time division duplex fashion. The transceiver units are synchronized to a common time frame determined by the master unit 4. This time frame consists of a series of time slots of equal length. Each radio packet transmitted in the network has its start aligned with the start of a slot and a single packet transmitted in the network at a time. When the master unit is performing point-to-point communication a transmitted radio packet is addressed to a particular transceiver which replies to the master unit by transmitting a radio packet addressed to the master unit in the next available time slot. When the master unit is performing point to multi-point communication a transmitted radio packet is addressed to all transceiver units. Any misalignment between the master and a slave is corrected by adjusting the timing of the slave.

The transceivers transmit and receive, in this example, in a microwave frequency band, illustratively 2.4 Ghz. The network reduces interference by changing the frequency at which each radio packet is transmitted. A number of separate frequency channels are assigned each with a bandwidth of 1 MHz, and the frequency may hop at a rate of 1600 hops/s. The frequency hopping of the transceivers communicating in or joining the network is synchronized and controlled by the master unit. The sequence of hopping frequencies is unique for the network and is determined by a unique identification of the master unit.

Each transceiver unit has a unique identification, the Unit ID, henceforth referred to as the BLUETOOTH ID. Each BLUETOOTH ID (48-bit IEEE address) is unique for each BLUETOOTH unit. A BLUETOOTH ID of a unit can be found through an enquiry routine over the RF interface to the unit.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters.

Figure 2:
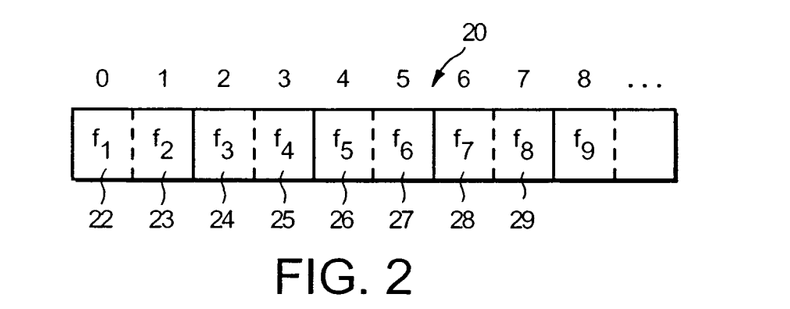
FIG. 2 illustrates the time frame of the communications network.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. Each slot is allocated a different one of a sequence of hopping frequencies. It is however, possible for a radio packet to extend over a number of slots and in this case the frequency at which the packet is transmitted remains constant at that allocated to the slot at the start of the packet. A slot has a constant time period and is typically 625 microseconds.

Figure 3:
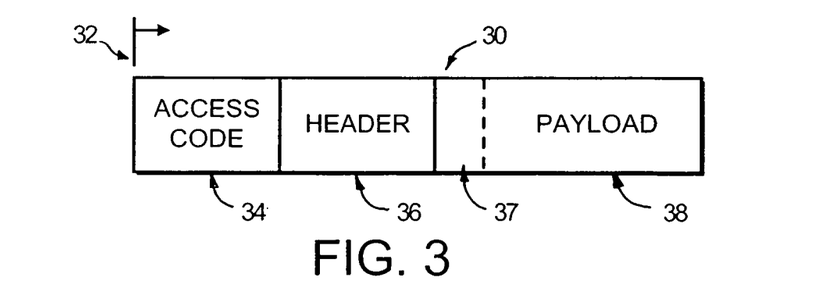
FIG. 3 illustrates a radio packet

Referring to FIG. 3, a typical radio packet 30 is illustrated. The radio packet has a start 32 and contains three distinct portions: a first portion contains an Access Code 34, a second portion contains a Header 36 and a third portion contains a Payload 38. The Payload 38 has a Payload Header 37.

Figure 4:
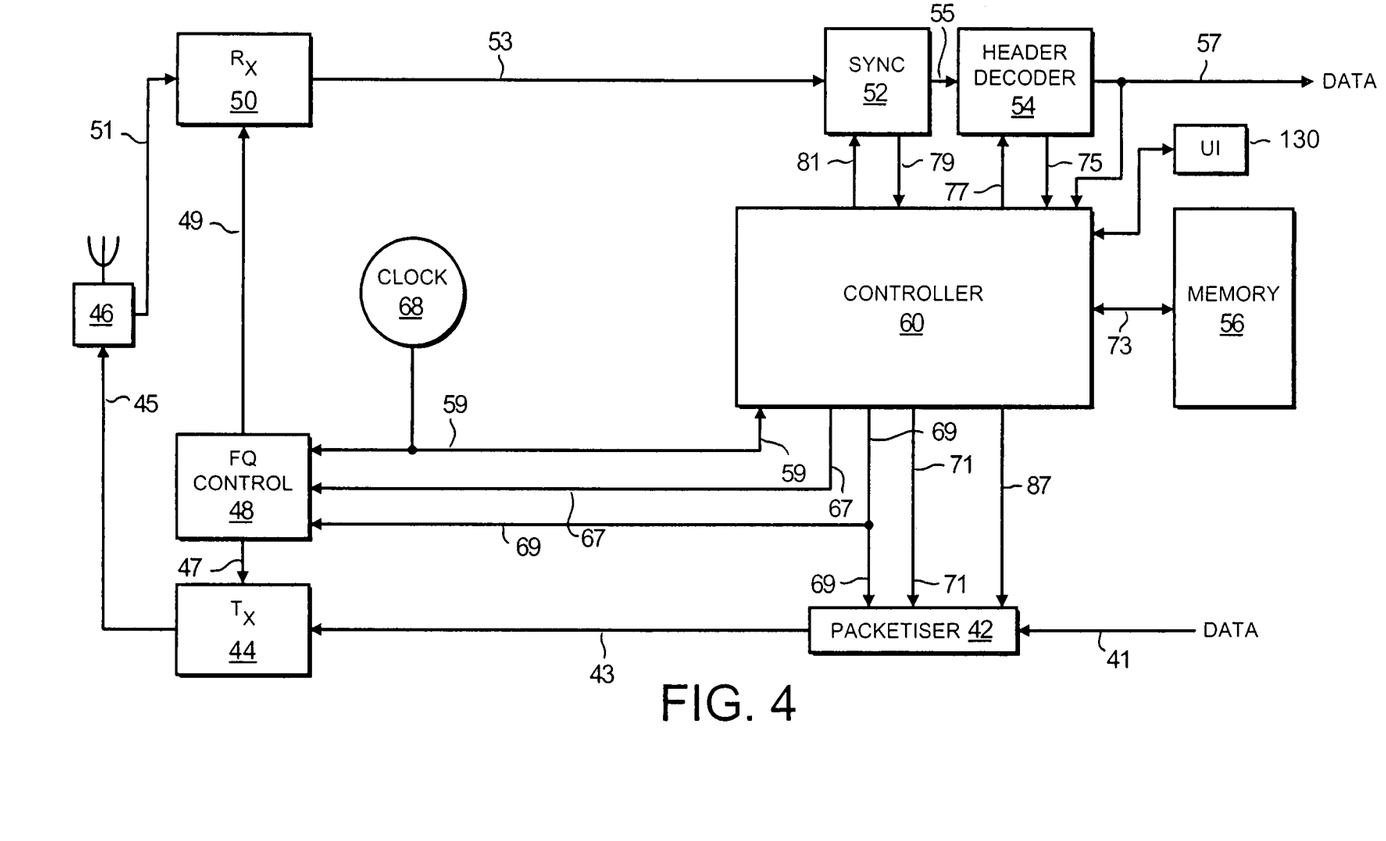
FIG. 4 illustrates a transceiver unit suitable for use as a master or slave.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchroniser 52, header decoder 54, controller 60, memory 56, which may include non-transitory machine accessible and readable media, packetiser 42, clock 68, frequency hop controller 48 and transmitter 44. Although these elements are shown as separate elements they may in fact be integrated together and may be carried out in software or in hardware.

Data to be transmitted in the payload by the transceiver unit 40 is supplied as data signal 41 to the packetizer 42. Control information to be transmitted in the payload of a packet is supplied in a payload control signal 87 provided by the controller 60 to the packetizer 42. The packetizer 42 also receives an access code control signal 69 and a header control signal 71 from controller 60 which respectively control the Access Code 34 and the Header 36 attached to the payload to form the packet. The packetizer 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency controller 48 to produce a digital signal 53. The digital signal 53 is supplied to the synchronizer 52 which synchronizes the transceiver unit 40 to the time frame of the network. The synchronizer is supplied with an access code signal 81 specifying the Access Code of the packet which the transceiver unit is expecting to receive. The synchronizer accepts those received radio packets with Access Codes which correspond to the expected Access Codes and rejects those received radio packets with Access Codes that do not correspond to the expected Access Code. A sliding correlation is used to identify the presence and the start of the expected Access Code. A sliding correlation is used to identify the presence and the start of the expected Access Code in a radio packet. If the radio packet is accepted then the radio packet is supplied to the header decoder 54 as a signal 55 and a confirmation signal 79 is returned to the controller 60 indicating the packet has been accepted by the synchronizer 52. The confirmation signal 79 is used by the controller in a slave unit to resynchronize the slave clock to the master clock. The controller compares the time at which a radio packet was received with the time at which the radio packet was expected to be received and shifts its timing to offset the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38.

The memory 56 may store applications.

Figure 5:
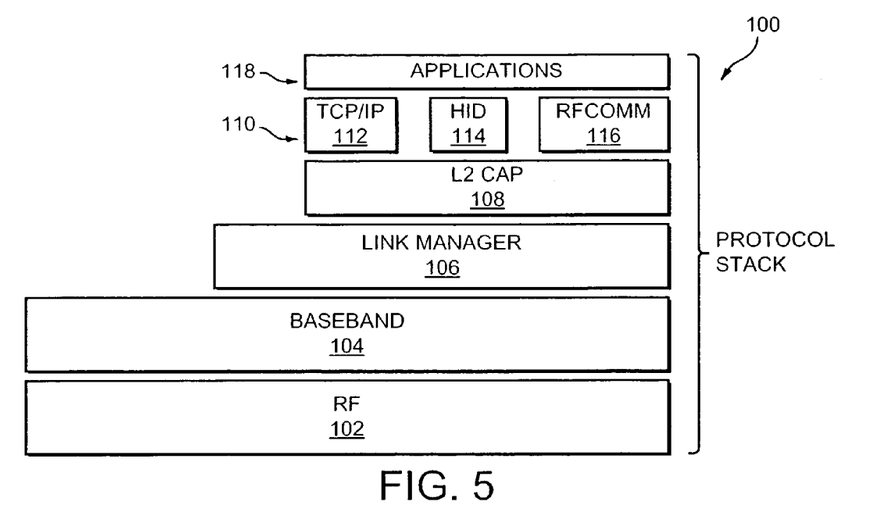
FIG. 5 illustrates a protocol stack used by a transceiver unit.

The operation of unit can also be understood from FIG. 5 which illustrates a Bluetooth protocol stack 100. The stack 100 includes, in order from the bottom up, the basic layers including RF layer 102, Baseband and Link Control layer 104, Link Manager Protocol Layer 106 and Logical Link Control and Adaptation Layer (L2CAP) 108. The layer L2CAP 108 connects with a number of overlying layers 110 including an Internet layer 112 for providing TCP/IP protocol, a Human Interface Device layer 114 for interfacing with the user interface 130 and a RF Communications layer 116 which emulates serial ports of a PC (com1, com2 com3 etc). Each of the layers 112, 114 and 116 may connect directly with one or more applications/services 118 and are able to multiplex their output so that data is sent to the correct one of several applications/services. The layer L2CAP 108 may also connect directly to an application or service.

In the units currently proposed, the Baseband and Link Control layer 104 enables the physical RF link between units using inquiry and paging to synchronise their clocks and transmission frequencies. The Link Manager Protocol Layer 106, henceforth referred to as the Link Layer 106, is responsible for link set-Up between two units including security, control of packet size, connection and power modes. In the proposal the Link Layer 106 responds to the payloads received in Link Management Protocol packets.

L2CAP allows higher level protocols to receive the payloads of received L2CAP data packets. The L2CAP protocol may be coupled to application and higher protocol layers and transfers data between either higher level protocols and services and the lower level Link Layer 106.

The payload header 37 of the payload 38 in packets 30 distinguishes L2CAP packets from Link Management Protocol packets. At present, it is required that the Link Management Protocol packets should be filtered out by the Link Layer 106 and not propagated to higher layers.

The BLUETOOTH technology should provide security measures both at the application layer and the link layer. Currently, in each BLUETOOTH unit the link layer 106 security measures are standardized. Authentication and encryption routines are implemented in a standard way in each device in the Link Layer 106.

Each unit stores one or more secret authentication link keys for use in communication with another unit or units. Typically a unit will permanently store a link key for each of the units it wishes to communicate with. Each link key is associated with the BLUETOOTH ID of the unit for which it is used to communicate.

The stored secret link key is used in an authentication routine to authenticate the identity of the unit being communicated with. The stored shared secret link key is also used to generated an encryption key. The encryption key is derived from but is different to the authentication link key and a new encryption key is generated each time encryption is used by using a random number generator.

A challenge response scheme is used to authenticate a unit. A valid pair of units share the same secret link key. A first unit produces a random number and challenges a second unit to authenticate itself by supplying the random number to it. The second unit returns the result of a function which takes as its arguments the BLUETOOTH ID of the second unit, the received random number and the key associated with the first unit but stored in the second unit. The first unit uses the same function to produce a result which if it equals the result received from the second unit authenticates the second device. The function in the first unit takes as its arguments the BLUETOOTH ID of the second unit which has been previously obtained, the random number and the key associated with the second unit but stored in the first unit.

The authentication procedure occurs in the Link Layer of each unit. Once authentication has been successfully completed access to the protocol layer, services and applications in the unit is unrestricted.

Each time encryption is required a random number is produced and an encryption key is formed from the random number and the authentication key for the link. The encryption process occurs in the Link Layer 106.

If the two devices have not previously communicated there will be no shared link key stored in the devices and it is necessary to 'pair' the devices. This may be done by inputting a PIN number into a user interface of the first unit and inputting the same PIN into a user interface of the second unit. The PINs may be used for the calculation of temporary initial authentication link keys until the calculation of a permanent shared secret authentication link key for communication between the devices.

One problem with the presently proposed security system is that it is inflexible. Once the link layer 106 has allowed a device access to the layers above it, its access is unrestricted except by specific security features built into the applications themselves. It would be desirable to provide an improved, more flexible, security system.

SUMMARY OF THE INVENTION

According to one aspect of the present invention there is provide a device for communicating with other devices to allow them to access applications, comprising: at least a first application; authentication means for authenticating a communicating device; access control means accessible by a communicating device requesting access to the first application without the communicating device having been authenticated by the authentication means, and arranged to arbitrate whether access of the communicating device to the first application is granted or refused wherein if the arbitration requires an authentication of the communicating device, the access control means instructs the authentication means to authenticate the communicating device.

According to another aspect of the present invention there is provided a device for communicating with other devices to allow them to access applications, comprising: at least first and second applications; authentication means for authenticating a communicating device; first access control means accessible by a communicating device requesting access to the first application without the communicating device having been authenticated by the authentication means, and arranged to arbitrate whether access of the communicating device to the first application is granted or refused wherein if the arbitration requires an authentication of the communicating device, the access control means instructs the authentication means to authenticate the communicating device. second access control means accessible by a communicating device requesting access to the second application without the communicating device having been authenticated by the authentication means, and arranged to arbitrate whether access of the communicating device to the second application is granted or refused wherein if the arbitration requires an authentication of the communicating device, the access control means instructs the authentication means to authenticate the communicating device, wherein the first access control means is accessible by a communicating device requesting access to the second application without the communicating device having been authenticated by the authentication means, and is arranged to provide the access of the communicating device to the second access means.

According to another aspect of the present invention there is provided a method of arbitrating the access of a requesting device to a service provided by a providing device comprising: sending a request to access the service from the requesting device to the providing device; receiving the request at the providing device and passing it, without authenticating the requesting device, to an arbitration means interfacing the service; determining, in the arbitration means, whether to grant or refuse access to the first application by the requesting device, wherein if the determination requires an authentication of the requesting device, the authentication is performed during that determination and not previously.

Embodiments of the invention provide a flexible security architecture that performs access checks when connection to a service is requested including, if necessary, authentication and encryption at the time of requesting access to application. The access control means may be a multiplexing protocol layer and the authentication means may be the link layer.

It is preferable that a device requesting access to a service is authenticated once and not many times. This may be achieved by having the request for access to a service arbitrated once-only, preferably in response to a query from the highest possible multiplexing layer (the one that directly interfaces the service).

Access to a service may be arbitrated in dependence on the security requirements of the requested service and/or the trust level of the device requesting access. The security architecture is implemented without changing the basic functions (pairing, authentication, encryption) which remain in the authentication means (link level).

According to a further aspect of the present invention there is provided a device for providing services and allowing access by other devices to the provided services, comprising: an interface for communicating with the other devices and receiving requests to access a service therefrom; arbitration means, for determining whether a requesting device communicating through the interface can access a service it has requested access to, arranged to store trust indications in association with requesting devices and arranged to receive from the interface an indication, originating from the other device, identifying the other device, wherein, if the requesting device has a stored trust indication associated therewith no user authorization is required and if the requesting device has no stored trust indication associated therewith user authorization is requirable; and a user interface for providing user authorization.

According to a further aspect of the present invention there is provided a device for providing services and allowing access by other devices to the provided services, comprising: an interface for communicating with the other devices and receiving requests to access a service therefrom; arbitration means, for determining whether a requesting device communicating through the interface can access a service it has requested access to, arranged to store trust indications in association with requesting devices and store security indications in association with provided services and arranged to receive from the interface indications, originating from the other device, identifying the other device and the service requested, wherein, if the requesting device has a stored trust indication associated therewith no user authorization is required and if the requesting device has no stored trust indication associated therewith user authorization is required in dependence upon the stored security indication associated with the requested service; and a user interface for providing user authorization.

According to the embodiments of the invention, access to services depends upon the trust level of the device which is trying to access the service. A trusted device, once its identity has been verified has access to all the services/applications. A not-trusted device may require user authorization each time it attempts to access a service. Therefore the grant of access of a not-trusted device to one service does not open up the other services to access. Separate user authorization is required to access each of the other services.

BRIEF DESCRIPTION OF THE DRAWINGS

For a better understanding of the present invention and to understand how the same may be brought into effect reference will now be made by way of example only to accompanying drawings in which.

DETAILED DESCRIPTION

Figure 6:
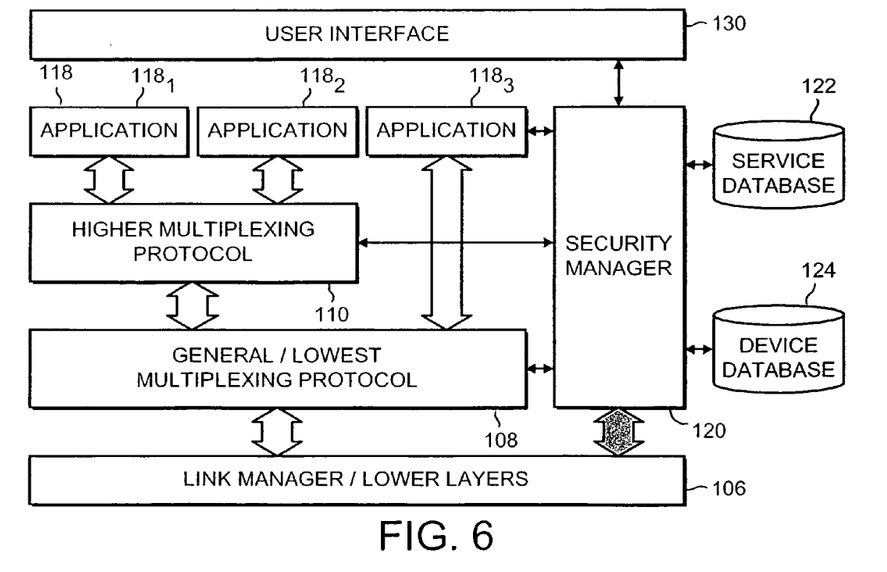
FIG. 6 illustrates a security architecture.

FIG. 6 illustrates a security architecture in accordance with one embodiment of the invention. The Bluetooth protocol stack 100 is illustrated. It includes lower layers including the link layer 106, a lowest multiplexing protocol layer 108 such as the L2CAP layer, a higher multiplexing protocol layer 110 such as the RFCOMM layer 116 and an application layer 118. Also illustrated are the User Interface 130, a security manager 120, a service database 122 and a device database 124.

The link layer 106 is directly connected to the lowest multiplexing protocol 108. Access to the higher multiplexing protocol 110 and the applications/services 118 from the link layer can only be achieved via the lowest multiplexing protocol layer 108.

The lowest multiplexing protocol layer 108 is directly connected to the higher multiplexing protocol 110 and also directly connected to application $118_3$. Access to the application $118_3$ can be made directly by the lowest multiplexing protocol, whereas access to applications $118_1$ and $118_2$ can only be made via the higher multiplexing protocol 110 which is directly connected to applications $118_1$ and $118_2$.

When a packet is received by a unit, the payload of the packet is passed to the lowest multiplexing protocol layer 108. The payload is not filtered by the link layer 106. If the received packet is a request to access a service/application, access to that service application is arbitrated.

The lowest multiplexing protocol layer 108 sends a query to the security manager asking whether access to a higher entity such as the higher protocol layer 110 or application $18_3$ should be given. This query identifies the service/application to which access is required and the BLUETOOTH ID of the device requesting access. The Security Manager determines if access to the next entity should be allowed and may control the Link Layer 106 to enforce authentication. If the querying protocol layer is not directly connected to the requested service, the Security Manager automatically sends a grant signal to the querying protocol layer 108 which then allows access to a higher protocol layer 110. If the querying protocol layer 108 is directly connected to the requested service 118$_3$, the Security Manager arbitrates to determine if access should be allowed. If access is allowed it sends a grant signal to the lowest multiplexing protocol layer 108 which then accesses the application 18$_3$. If access is denied, the Security Manager 120 sends a refusal signal to the lowest multiplexing protocol 108 preventing access of the requesting unit to the desired service.

The request to access a service (application 118$_1$ or 118$_2$) received at the higher multiplexing protocol 110 from the lowest multiplexing protocol 108, causes the layer 110 to send a query to the Security Manager asking whether access to a higher entity such as a higher multiplexing protocol layer (not illustrated) or application 118$_1$ or 118$_2$. This query identifies the service/application to which access is required and BLUETOOTH ID of the device requesting access. If the querying protocol layer is not directly connected to the requested service, the Security Manager automatically sends a grant signal to the querying protocol layer 108 which then allows access to a higher protocol layer. If the querying protocol layer 110 is directly connected to the requested service, the Security Manager arbitrates to determine if access should be allowed. If access is allowed it sends a grant signal to the querying protocol layer 110 which then accesses the requested application. If access is denied, the Security Manager 120 sends a refusal signal to the querying protocol layer 110 preventing access of the requesting unit to the desired service.

The lowest multiplexing protocol 108 makes an enquiry to the Security Manager for every received request for access to a service. The request is allowed to progress to a higher layer or service only if access is granted by the Security Manager. Each of the multiplexing protocol layers through which a request to access a service is routed, makes an enquiry to the Security Manager each time a request is received. The request is allowed to progress to a higher layer or service only if access is granted by the Security Manager. No application/service can therefore be accessed by a unit without at least one arbitration by the Security Manager.

The Security manger 120 is a software module with interfaces to protocols 108 and 110, services/applications 118, the UI 130, the databases 122 and 124 and the link layer 106. The security manager controls the link layer and the performance of its standard functions such as authentication, encryption and pairing. The Security Manager knows the identity of the services each of the protocol layers has direct access to.

Figure 7A:
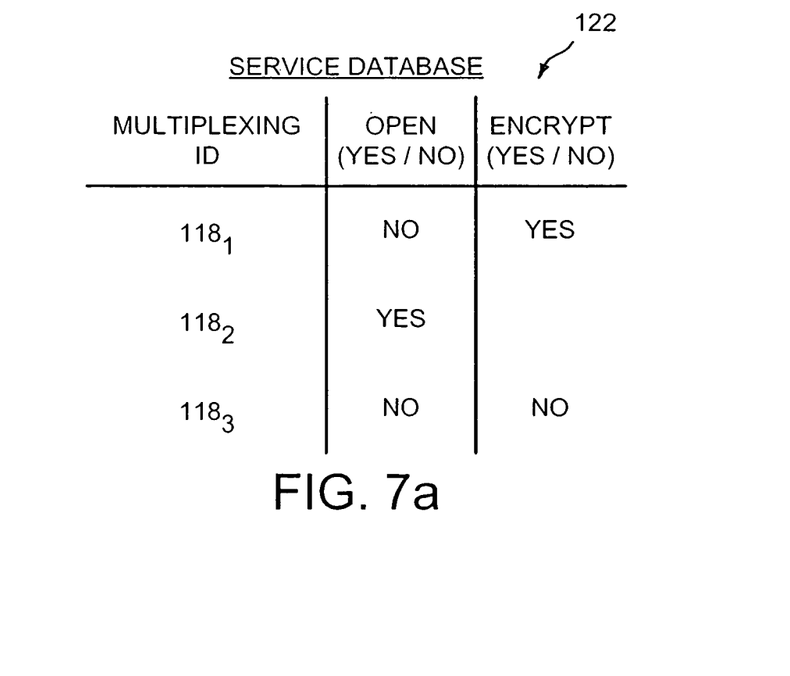
FIGS. 7a and 7b illustrate, respectively, a service database and a device database.
Figure 7B:
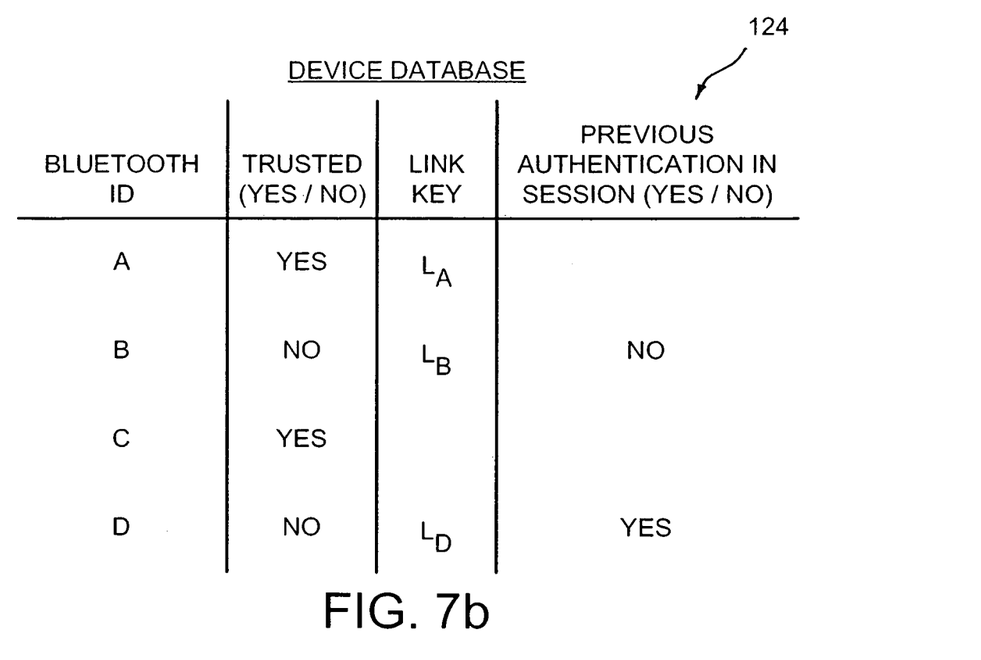

The Security Manager may use its interfaces to the service database 122, the device database, the link manager and the UI 130 to perform an above-mentioned arbitration. An exemplary service database is illustrated in FIG. 7a and an exemplary device database is illustrated in FIG. 7b. When the Security Manager receives a query from the protocol layers or applications it queries the databases 122 and 124. It accesses the fields associated with the requested application/service from the service database and accesses the fields associated with the BLUETOOTH ID of the requesting unit from the device database 124.

The databases are used to define different security levels for devices and services. Each unit has a device database which stores information about other devices it has previously communicated with. The device database has an entry for each BLUETOOTH ID of the other devices. Each entry has associated fields including a first field to indicate whether that device is trusted or not trusted, a second field for storing the current link key for communication with that devices and a third field to indicate whether there has been a successful authentication with that device in the current session.

The trusted field is binary and there are therefore two security levels for devices-trusted and not-trusted. If a first unit records a second unit as trusted in its device database, then that second unit can access all the services of the first unit after authentication. If the first unit records the second unit as not-trusted (untrusted), the second unit may have its access to the services of the first unit restricted in dependence upon the service database in the first unit.

Each unit has a service database (FIG. 7a) which stores information about the applications and services in that unit available for access by another unit. The service database has an entry for each available application or service.

Each entry has associated fields including a first field to indicate whether that service is open or not open and a second field to indicate whether encryption is required. This security information can be provided by the services/applications to the security manager during a registration procedure.

The Security Manager defines three levels of security in relation to a service. What the level is depends upon the security rating of the service (open/not-open) and the security rating of the requesting device (trusted/untrusted). When the security rating of the service is open there is no dependence upon whether the requesting device is trusted or untrusted and the open services are open to all devices.

When the security rating of the service is not-open then there is a dependence upon the trust level of the device requesting access. If the requesting device is trusted, then the device requesting access to the service must be authenticated before access to the service is granted. If the requesting device is untrusted, then the device requesting services must be authenticated and then explicit user authorization must be given before access to the service is granted.

Figure 9:
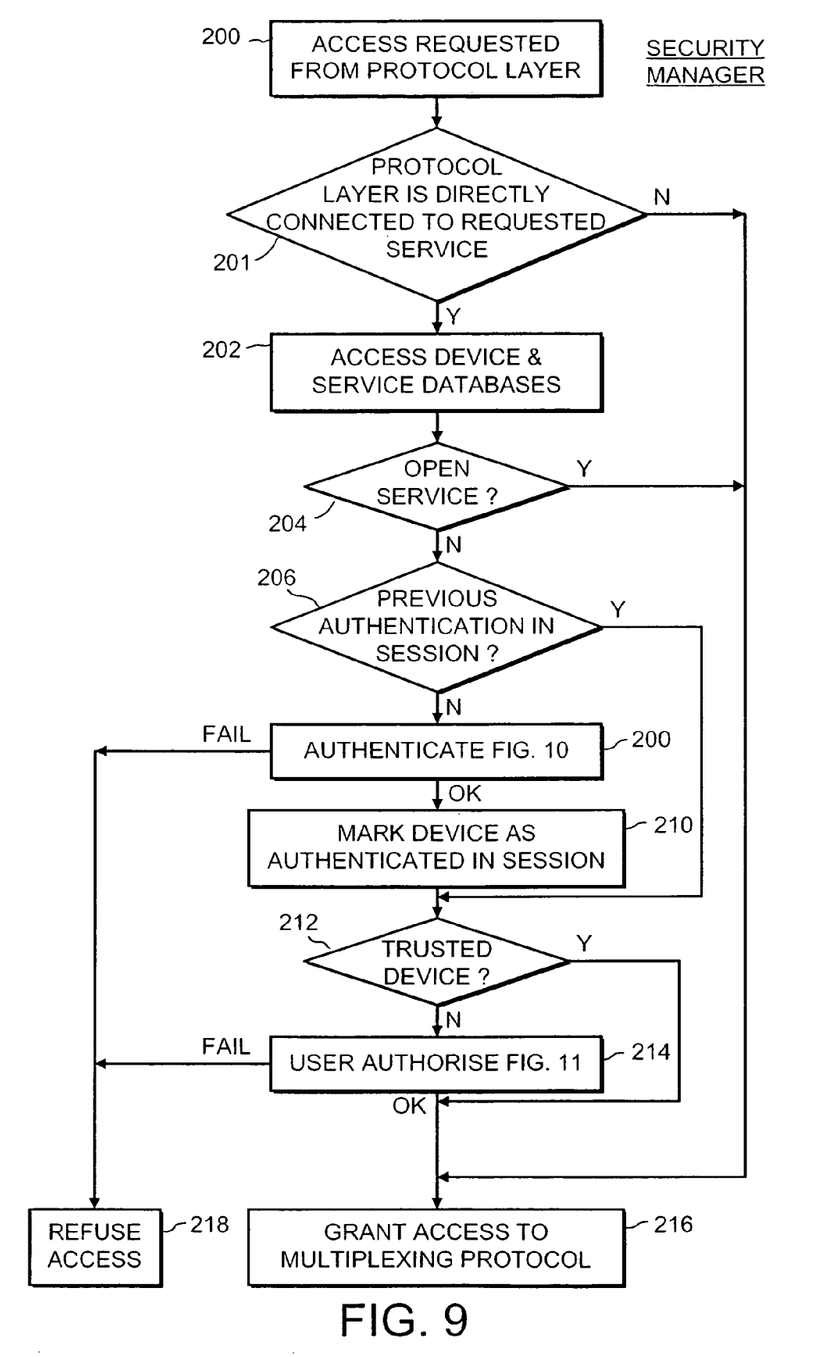
FIGS. 9 to 11 are flow diagrams illustrating the arbitration process performed by the controller to determine if a device should access a service.
Figure 10:
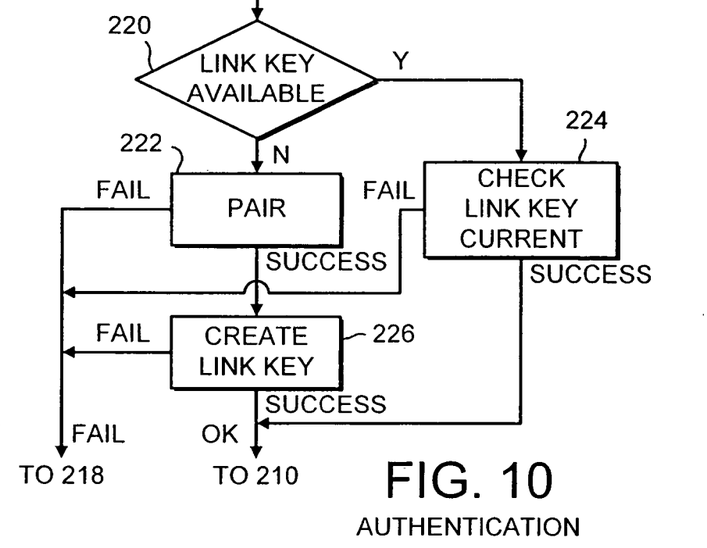
Figure 11:
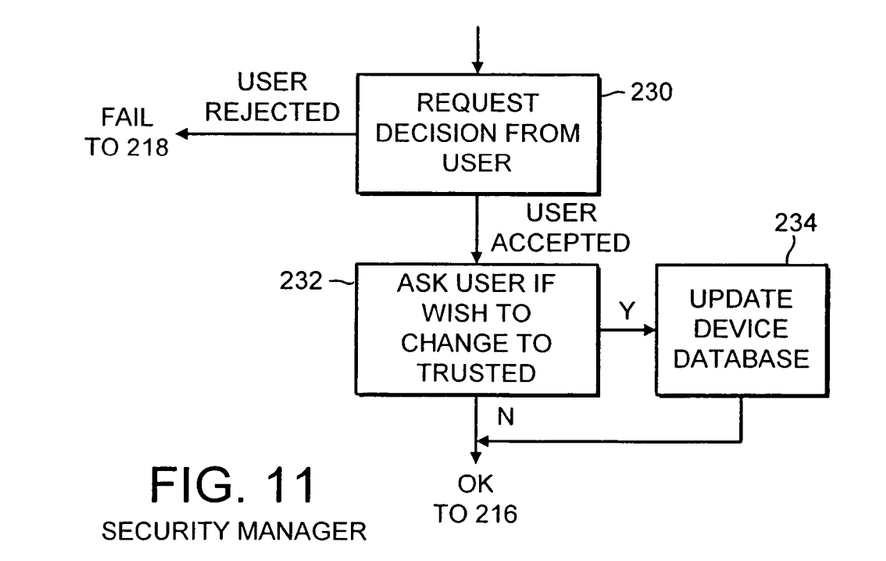

Referring to the flow diagrams in FIGS. 9 to 11, after the Security Manager receives an query (200) from the multiplexing protocol layers 108 or 110, it determines whether the querying multiplexing layer is directly connected to (interfaces with) the requested service (201). If the query from the protocol layer concerns a service to which the protocol layer is not directly connected, but is indirectly connected through higher multiplexing protocol layers, the Security Manager allows the passage of the request to the higher multiplexing protocol layer by sending a grant signal to the querying protocol layer. If the query from the querying protocol layer concerns a service to which the querying protocol layer is directly connected, the Security Manager performs an arbitration to determine if access to the service should be allowed or denied.

The arbitration is initiated by the Security Manager accessing (202) the databases 122 and 124, identifying whether the requesting device is trusted and identifying whether the requested service is open (204).

If the requested service is an open service, the Security Manager grants access (216) by sending a grant signal to the querying protocol layer which then accesses the requested application. If the requested service is not an open service the arbitration continues.

If the requesting device is trusted, authentication only is required. If authentication of the requesting device has not occurred in this session (206) (determined from, the 3$^{rd}$ field of the entry for the requesting device in the device database), then the security manager instructs the link layer 106 to perform an authentication (208). Referring to FIG. 10, the security manager provides the link layer with the current key (if any) stored in the $2^{nd}$ field of the database entry. The link layer performs the authentication (with pairing if necessary) and informs the security manager if the authentication has been successful. The processes of pairing (222), checking the link key is current (224) and creating a link key are implementation dependent and are not described further. If the authentication is unsuccessful the Security Manager sends (218) a refusal signal to the querying protocol thereby preventing access to the requested service. If the authentication is successful, link layer also returns the current link key for the requesting device. The Security Manager then updates (210) the device database, placing the current link key in the second field of the database entry and indicating that successful authentication has occurred in this session in the third field of the entry. The Security Manager then determines (212) whether the requesting device is a trusted device. As the device is trusted the Security Manager sends (216) a grant signal to the querying protocol thereby allowing access to the service.

If the requesting device is not-trusted, authentication and user authorization is required. If authentication of the requesting device has not occurred in this session (206) (determined from the $3^{rd}$ field of the entry for the requesting device in the device database), then the security manager instructs (208) the link layer 106 to perform an authentication. The security manager provides the link layer with the current key (if any) stored in the $2^{nd}$ field of the database entry. The link layer performs the authentication (with pairing if necessary) as previously described in relation to FIG. 10, and informs the security manager if the authentication has been successful. If the authentication is unsuccessful the Security Manager sends (218) a refusal signal to the querying protocol thereby preventing access to the service. If the authentication is successful the link layer also returns the current link key for the requesting device and the Security Manager updates the device database (210), placing the current link key in the second field of the database entry and indicating that successful authentication has occurred in this session in the third field of the entry. The security manager checks (212) the trusted status of the requesting device. As the device is not-trusted, the security manager then attempts to obtain user authorization (214) as illustrated in FIG. 11. The security manager controls (230) the UI 130 to indicate to the user that some positive act is required to allow a requesting device access to a service. The service and/or the requesting device may be identified on a screen. The user can agree or disagree to the access. Agreement causes the Security Manager to give (216) a grant signal to the querying protocol layer thereby allowing access to the requested service. Disagreement causes the Security Manager to give (218) a rejection signal to the enquiring protocol thereby preventing access to the requested service. The fact that the user authorization has been given is not recorded and access is therefore one time only. The Security Manager, may then as an option, offer (232) the user the opportunity to change the trust status of the requesting device from untrusted to trusted with subsequent updating (234) of the device database.

If encryption is required in addition to authentication, the Security Manager controls the link layer 106 to perform it, before allowing connection to the application/service requested.

The applications/services 118 and the higher multiplexing protocol 110 must register their multiplexing policies with the Security Manager so that it can determine which application/service is directly connected to each protocol layer.

Figure 8A:
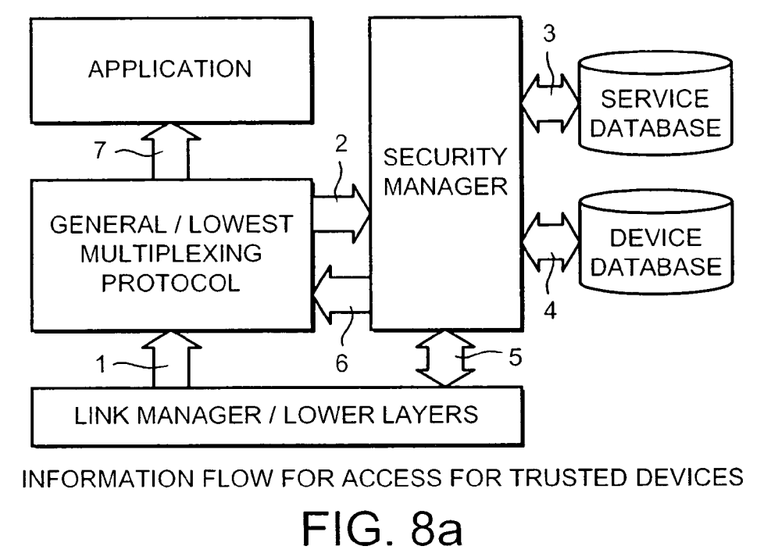
FIGS. 8a and 8b illustrate information flow in the security architecture when access for a not-open service is requested by a trusted and untrusted device respectively
Figure 8B:
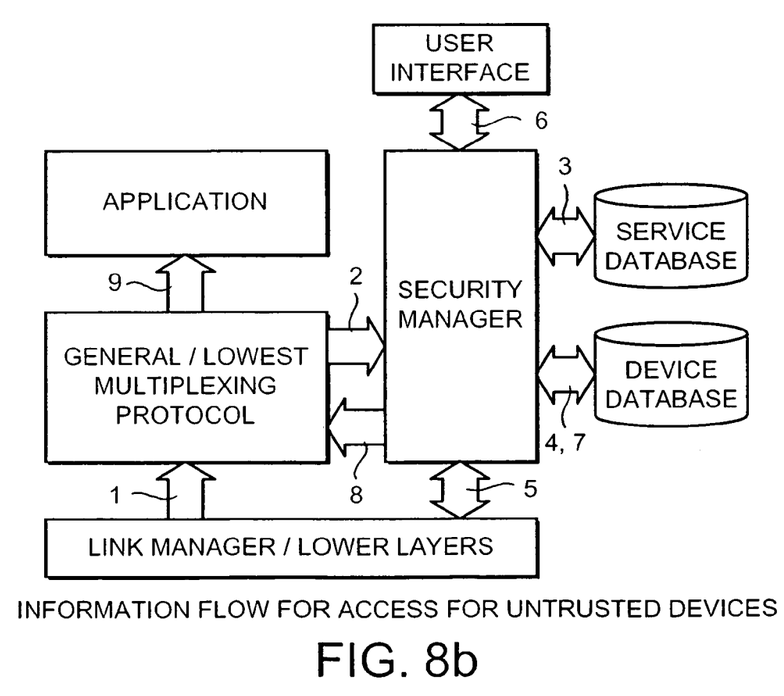

The process of accessing a service using a trusted device is further illustrated in FIG. 8a. The protocol layer is directly connected to a service.
1. Connect request to protocol layer
2. If access control occurs at this protocol layer, then send enquiry to Security Manager
3. Security manager looks up service database
4. Security manager looks up device database
5. Security Manager enforces standard authentication (and possibly encryption) in the link layer
6. Security Manager' grants access or link terminated
7. Protocol layer continues to set up the connection by contacting higher protocol layers/services The process of accessing a service using an untrusted devices is further illustrated in |FIG. 8b. The protocol layer is directly connected to a service.
1 Connect request to protocol layer
2 If access control occurs at this protocol layer, then send enquiry to Security Manager
3 Security manager looks up service database
4 Security manager looks up device database
5 Security Manager enforces standard authentication (and possibly encryption) in the link layer
6 Security Manager asks for manual user authorization
7 Security manager may update device database (trusted?)
8 Security Manager grants access or link terminated
9 Protocol layer continues to set up the connection by contacting higher protocol layers/services In this embodiment authentication (5) is performed before authorisation (6). It would of course be possible to perform authorisation (6) before authentication (5).

The preceding description describes a preferred implementation of the claimed invention in a preferred application, namely a low power radio frequency communications network in accordance with the BLUETOOTH Standard. However, it should be appreciated that other implementations and applications may be utilized without departing from the scope of the invention.

In particular, in the embodiment described, whether or not the device authentication is required depends simply on the service requested and the content of the service database, in particular, whether the service is open or not-open. Whether or not user authorization is required is dependent on the service requested and the content of the service database, in particular, whether the service is open or not-open and dependent upon the identity of the device requesting access and the content of the device database, in particular whether the requesting device is trusted or not-trusted.

It would of course be possible to make device authentication solely or additionally dependent upon the trust status of the device requesting the service. It would also be possible to make user authorization solely or additionally dependent upon the service requested so that, for example, user authorization is or is not required for a not-trusted device accessing a particular service in dependence on the stored attributes of the service.

In the above embodiments, the operation of the security architecture has been described in relation to a device requesting access to a service in the 'secure' device. The security architecture may operate in both directions so that information is not sent from the 'secure' device to another device without a decision being made by the security manager. A protocol layer, preferably the highest possible multiplexing protocol layer, and the security manager in combination arbitrate whether the information is sent or not. This arbitration may require authentication and/or authorization as described above.

While preferred embodiments of the invention have been described in detail, it will be apparent to those skilled in the art that many changes and modifications may be made without departing from the disclosed invention in its broader aspects; and it is intended that the appended claims cover all changes and modifications as fall within the true spirit and scope of the contributions made to the art hereby.

What is claimed is:

1. An apparatus comprising:
   at least a first application;
   an authentication component configured to authenticate a communicating device;
   an access control component accessible in response to a communicating device requesting access to the first application without the communicating device having been authenticated by the authentication component, and arranged to arbitrate whether access of the communicating device to the first application is granted or refused wherein the access control component is configured to instruct the authentication component to authenticate the communicating device if the access control component determines, based on at least one of stored application security level data and stored device security level data, that authentication is required, wherein the access control component is configured to receive indications originating from the communicating device identifying the communicating device and the application requested; and
   wherein the authentication component is configured to authenticate the communicating device by verifying an identity of the communicating device or by verifying a personal identification number.

2. The apparatus as claimed in claim 1 wherein the access control component is arranged to store security indications in association with accessible applications, wherein a stored security indication associated with the first application is indicative of whether authentication of the communicating device is or is not required during arbitration.

3. The apparatus as claimed in claim 2 wherein the stored security indication associated with the first application is indicative of whether authentication of the communicating device is or is not required during arbitration, in independence of the identity of the communicating device.

4. The apparatus as claimed in claim 1 further comprising a user interface configured to authorize access to an application during arbitration, the access control component being arranged to store security indications in association with accessible applications, wherein a stored security indication associated with the first application is indicative of whether user authorization of the communicating device is or is not required during arbitration.

5. The apparatus as claimed in claim 4 wherein the access control component is further arranged to store trust indications in association with devices, and wherein the stored security indication associated with the first application is indicative of whether user authorization of the communicating device is or is not required during arbitration in dependence upon any stored trust indication associated with the communicating device.

6. The apparatus as claimed in claim 1 wherein authentication comprises secret key exchange between the apparatus and the communicating device.

7. The apparatus of claim 1, wherein the apparatus is configured to receive a personal identification number (PIN) and calculate a temporary initial authentication link key using the received personal identification number (PIN).

8. An apparatus comprising:
   at least first and second applications;
   an authentication component configured to authenticate a communicating device; and
   an access control component, wherein
      the access control component is configured to exchange signals with a first multiplexing protocol layer,
      the first multiplexing protocol layer is accessible by a communicating device requesting access to the first application without the communicating device having been authenticated by the authentication component,
      the access control component is configured to arbitrate whether access of the communicating device to the first application is granted or refused,
         the access control component is configured to instruct the authentication component to authenticate the communicating device after determining, based on at least one of stored application security level data and stored device security level data, that authentication is required, the access control component is configured to exchange signals with a second multiplexing protocol layer,
      the second multiplexing protocol layer is accessible by a communicating device requesting access to the second application without that communicating device having been authenticated by the authentication component,
      the access control component is configured to arbitrate whether access to the second application, by the communicating device requesting access to the second application, is granted or refused,
      the access control component is configured to instruct the authentication component to authenticate the communicating device requesting access to the second application after determining, based on at least one of stored application security level data and stored device security level data, that authentication is required,
      the first multiplexing protocol layer is accessible by the communicating device requesting access to the second application without that communicating device having been authenticated by the authentication component, and is arranged to provide that communicating device access to the second multiplexing protocol layer, and
   the authentication component is configured to authenticate the communicating device requesting access to the second application by verifying an identity of that communicating device or by verifying a personal identification number.

9. The apparatus as claimed in claim 8, wherein the access control component is arranged to store security indications in association with accessible applications, wherein a first stored security indication associated with the first application is indicative of whether authentication of the communicating device is or is not required during arbitration and wherein a second stored security indication associated with the second application and indicative of whether authentication of the communicating device is or is not required during arbitration.

10. The apparatus of claim 8, wherein the authentication component is configured to authenticate the communicating device by verifying an identity of the communicating device or by verifying a personal identification number.

11. The apparatus of claim 8, wherein the apparatus is configured to receive a personal identification number (PIN)

and calculate a temporary initial authentication link key using the received personal identification number (PIN).

12. An apparatus comprising:
  a processor; and
  a memory having stored therein machine executable instructions, that when executed, cause the apparatus to:
    receive, from a requesting device, a request at the apparatus and passing it, without authenticating the requesting device, to an arbitration component;
    arbitrate, in the arbitration component, whether to grant or refuse access to a first application to the requesting device, the arbitration including a determination, on the basis of at least one of the identity of first application and the identity of the requesting device, of whether an authentication of the requesting device is required,
    if authentication is required, perform the authentication during the arbitration, wherein the
    authentication includes verifying an identity of the requesting device or verifying a personal identification number.

13. The apparatus as claimed in claim 12 wherein the instructions further cause the apparatus to:
  store security indications in association with accessible applications, wherein a stored security indication associated with the first application is indicative of whether authentication of the requesting device is or is not required during arbitration.

14. The apparatus as claimed in claim 13 wherein the stored security indication associated with the first application is indicative of whether authentication of the requesting device is or is not required during arbitration, in independence of the identity of the requesting device.

15. The apparatus as claimed in claim 12 wherein the instructions further cause the apparatus to:
  authorize access to an application during arbitration via a user interface, and store security indications in association with accessible applications, wherein a stored security indication associated with the first application is indicative of whether user authorization of the communicating device is or is not required during arbitration.

16. The apparatus as claimed in claim 15 wherein the instructions further cause the apparatus to:
  store trust indications in association with devices, and wherein the stored security indication associated with the first application is indicative of whether user authorization of the requesting device is or is not required during arbitration in dependence upon any stored trust indication associated with the requesting device.

17. The apparatus as claimed in claim 12 wherein authentication comprises secret key exchange between the providing device and the requesting device.

18. A method comprising:
  receiving, by a providing device, a request to access an application and passing it, without authenticating a requesting device, to an arbitration component interfacing with the application;
  determining, by the providing device, in the arbitration component, whether to grant or refuse access to the application, said determining including an authentication of the requesting device, said authentication performed during the determination, wherein the determination is made on the basis of the identity of the application requested; and
  wherein authentication includes verifying an identity of the requesting device or verifying a personal identification number.

19. The method of claim 18 wherein the determination is made on the basis of the identity of the requesting device.

20. The method as claimed in claim 18, comprising storing security indications in association with accessible applications, wherein a stored security indication associated with the application is indicative of whether authentication of the requesting device is or is not required during the determination.

21. The method as claimed in claim 20 wherein the stored security indication associated with the application is indicative of whether authentication of the requesting device is or is not required during the determination, in independence of the identity of the requesting device.

22. The method as claimed in claim 18 further comprising authorizing access to the application during the determination via a user interface, and storing security indications in association with accessible applications, wherein a stored security indication associated with the application is indicative of whether user authorization of the requesting device is or is not required during the determination.

23. The method as claimed in claim 22 comprising storing trust indications in association with devices, and wherein the stored security indication associated with the application is indicative of whether user authorization of the requesting device is or is not required during the determination in dependence upon any stored trust indication associated with the requesting device.

24. The method as claimed in claim 18 wherein authentication comprises secret key exchange between the providing device and the requesting device.

25. The method of claim 18, further comprising receiving a personal identification number (PIN) and calculating a temporary initial authentication link key using the received personal identification number (PIN).

26. A non-transitory machine accessible and computer readable storage medium encoded with instructions that, when executed by a processor, cause the processor to perform:
  receiving a request to access an application and passing it, without authenticating a requesting device, to an arbitration component interfacing with the application;
  determining, in the arbitration component, whether to grant or refuse access to the application, said determining including an authentication of the requesting device, said authentication performed during the determination, wherein the determination is made on the basis of the identity of the application requested; and
  wherein authentication includes verifying an identity of the requesting device or verifying a personal identification number.

27. The non-transitory machine accessible and computer readable storage medium as claimed in claim 26, encoded with instructions that, when executed by the processor, further cause the processor to perform:
  storing security indications in association with accessible applications, wherein a stored security indication associated with the application is indicative of whether authentication of the requesting device is or is not required during the determination.

* * * * *